(12) United States Patent
Skjærseth et al.

(10) Patent No.: US 10,794,128 B2
(45) Date of Patent: Oct. 6, 2020

(54) TORQUE ABSORBER FOR ABSORBING A TORQUE AND AN APPARATUS COMPRISING SUCH A TORQUE ABSORBER

(71) Applicant: WEST DRILLING PRODUCTS AS, Stavanger (NO)

(72) Inventors: Odd B. Skjærseth, Stavanger (NO); Bjørn Eilertsen, Hundvåg (NO)

(73) Assignee: West Drilling Products AS, Stavanger (NO)

( * ) Notice: Subject to any disclaimer, the term of this patent is extended or adjusted under 35 U.S.C. 154(b) by 388 days.

(21) Appl. No.: 15/735,874

(22) PCT Filed: Jun. 12, 2016

(86) PCT No.: PCT/IB2016/053459
§ 371 (c)(1),
(2) Date: Dec. 12, 2017

(87) PCT Pub. No.: WO2016/199102
PCT Pub. Date: Dec. 15, 2016

(65) Prior Publication Data
US 2020/0032596 A1 Jan. 30, 2020

(30) Foreign Application Priority Data

Jun. 12, 2015 (NO) .................................. 20150769

(51) Int. Cl.
*E21B 19/16* (2006.01)
*F16F 9/14* (2006.01)
*F16F 9/32* (2006.01)

(52) U.S. Cl.
CPC .............. *E21B 19/166* (2013.01); *F16F 9/14* (2013.01); *F16F 9/3214* (2013.01); *F16F 9/3235* (2013.01)

(58) Field of Classification Search
CPC ........ E21B 19/166; E21B 19/163; F16F 9/14; F16F 9/3214; F16F 9/3225
(Continued)

(56) References Cited

U.S. PATENT DOCUMENTS 4,700,787 A * 10/1987 Buck ..................... E21B 19/166
173/164
4,739,681 A 4/1988 Pietras
(Continued)

FOREIGN PATENT DOCUMENTS

CN 1329206 1/2002
CN 202673992 1/2013
(Continued)

OTHER PUBLICATIONS

Office action from CN patent office, submitted as statement of relavance for non English refererences.
(Continued)

*Primary Examiner* — Hadi Shakeri
(74) *Attorney, Agent, or Firm* — Christian D. Abel

(57) ABSTRACT

A torque absorber is described for absorbing a rotational torque that occurs when tubular elements are screwed together, the torque absorber comprising at least one cylinder and at least one piston movably arranged in the cylinder. The at least one cylinder is curved in the longitudinal direction of the cylinder and the at least one piston has a corresponding curved shape, such that the at least one piston can be moved into and out of the at least one cylinder. There is also described an apparatus comprising one or more torque absorbers for absorbing a rotational torque that occurs between two parts in the apparatus on the screwing together of tubular elements.

14 Claims, 3 Drawing Sheets

(58) Field of Classification Search
USPC .......................................................... 81/57.35
See application file for complete search history.

(56) References Cited

U.S. PATENT DOCUMENTS

| | | | | |
|---|---|---|---|---|
| 4,938,109 | A * | 7/1990 | Torres ................. | B25B 23/1456 |
| | | | | 173/181 |
| 6,752,044 | B2 * | 6/2004 | Hawkins, III ........ | E21B 19/163 |
| | | | | 81/57.16 |
| 2006/0096818 | A1 | 5/2006 | Moradian | |
| 2012/0304832 | A1 | 12/2012 | Hitchcock | |

FOREIGN PATENT DOCUMENTS

| | | |
|---|---|---|
| CN | 103958935 | 7/2014 |
| DE | 20 57 603 A1 | 8/1972 |
| EP | 0098614 A2 | 1/1984 |
| EP | 2597254 A2 | 5/2013 |
| WO | 2014/204799 A1 | 12/2014 |

OTHER PUBLICATIONS

International Search Report of the International Searching Authority issued in PCT/IB2016/053459 dated Oct. 19, 2016 (3 pages).
Written Opinion of the International Searching Authority issued in PCT/IB2016/053459 dated Oct. 19, 2016 (6 pages).
International Preliminary Report on Patentability from PCT/IB2016/053459 completed on Aug. 28, 2017 (10 pages).
Norwegian Search Report issued in Application No. 20150769 dated Jan. 12, 2016 (2 pages).

* cited by examiner

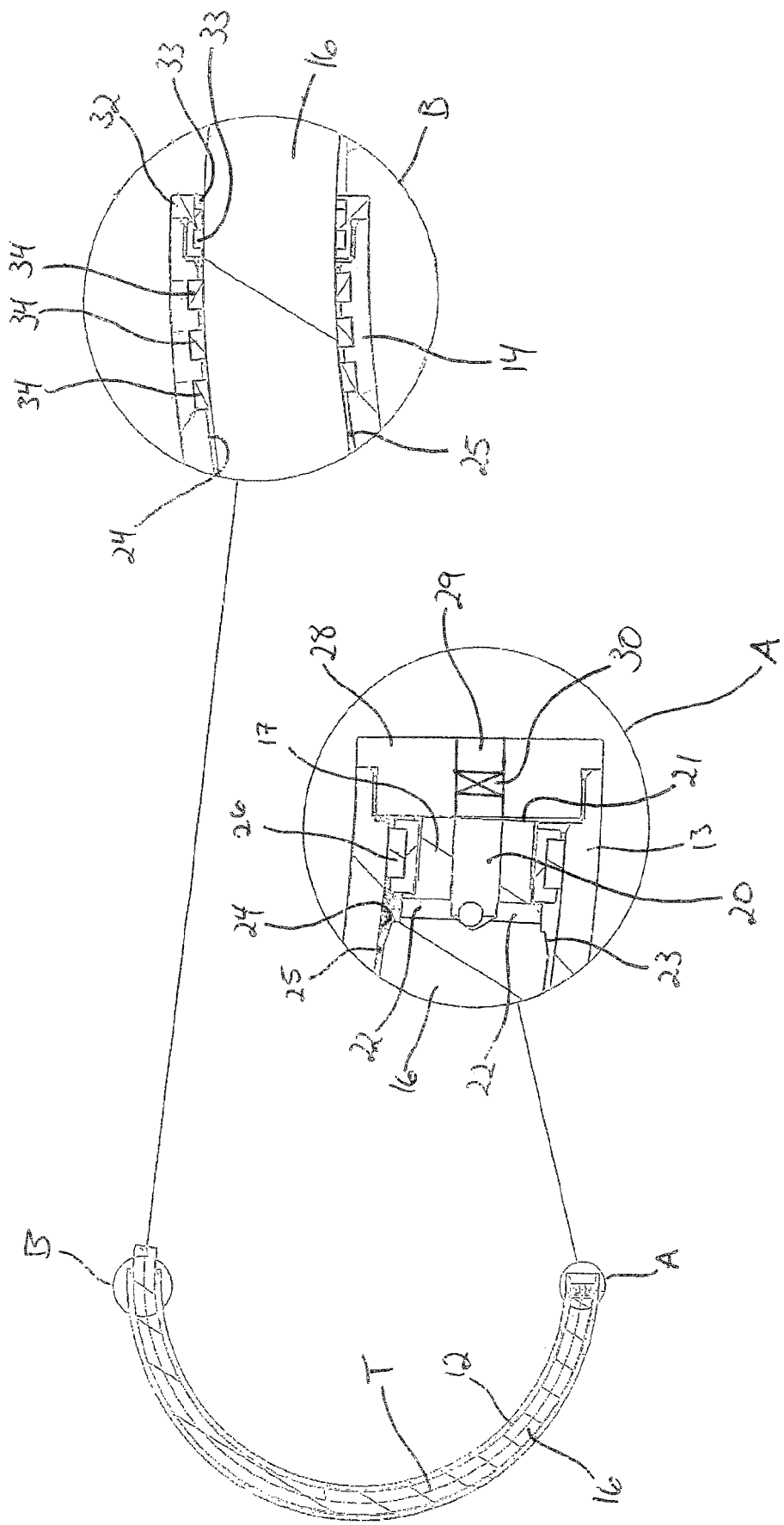

TORQUE ABSORBER FOR ABSORBING A TORQUE AND AN APPARATUS COMPRISING SUCH A TORQUE ABSORBER

FIELD OF THE INVENTION

The present invention relates to a torque absorber for absorbing a rotational torque that occurs during the screwing together of tubular elements, and to an apparatus for screwing together tubular elements comprising at least one such torque absorber.

BACKGROUND OF THE INVENTION

When drilling a hydrocarbon well it is necessary to screw together and unscrew from one another different elements that are to be run into the well. It may be a question of tubular elements that are screwed together or unscrewed from one another, for example, a tubular element that is to be screwed onto or unscrewed from the pipe string during drilling, or other elements to be run into the well that are screwed onto the pipe string. This screwing together takes place with the aid of machines that grip the two elements to be screwed together and screw them together or unscrew them from one another. A problem that arises when screwing elements together is that when, for example, a tubular element is to be screwed onto the pipe string, the threaded connection could be damaged when the tubular element is screwed fully onto the pipe string, i.e., that the "bottom" of the threaded portion is reached, whilst it takes some time before the torque from the drive unit that rotates the tubular element is reduced. In the course of the time it takes to reduce the rotational torque from the drive unit there is a risk that the threaded connection will be damaged or, at worst, destroyed.

SUMMARY OF THE INVENTION

It has therefore been a general object of the present invention to provide a solution able to absorb a rotational torque that occurs when an element is screwed onto another element.

It has also been an object of the present invention to provide a solution that prevents damage to a threaded connection when two elements are screwed together automatically.

It has further been an object to prevent damage to threads when an element is screwed onto a tubular element or a pipe string, such as a tubular element that is screwed onto a pipe string.

These objects are achieved by a torque absorber as defined in independent claim 1 and an apparatus as defined in independent claim 8, and uses of the torque absorber and apparatus as defined in claims 21 and 22. Additional embodiments of the invention are defined in dependent claims 2-7 and 9-20.

The torque absorber comprises at least one cylinder that is circular in shape in its longitudinal direction, and where the length of the cylinder preferably extends over a curve of 180 degrees or less. In the at least one cylinder is arranged a piston that is slightly longer than the cylinder such that when the piston is pushed all the way into the cylinder, it will project from the opposite end of the cylinder. Thus, the cylinder can be fastened to a first part whilst the piston can be fastened to a second part of a device or apparatus, the first part and the second part being rotatable relative to each other about a given axis of rotation. The curved torque absorber has a centre that coincides with the axis of rotation, the torque absorber thereby being able to absorb a rotational torque about the axis of rotation that occurs between the first part and the second part. In the cylinder is provided a fluid that can flow out of and into the cylinder such that the absorbing effect can be maintained when another rotational torque occurs between the first part and the second part.

One or more such torque absorbers can be arranged in an apparatus that screws together different elements to reduce the effect of an impact or a rotational torque that occurs when the threaded portions on the elements are screwed together until they bottom in order to prevent the threads on the threaded portions from being damaged or destroyed.

A torque absorber is provided for absorbing a rotational torque that occurs when tubular elements are screwed together, the torque absorber comprising at least one cylinder and at least one piston movably arranged in the cylinder. The at least one cylinder is curved in the longitudinal direction of the cylinder and the at least one piston has a corresponding curved shape such that the at least one piston can be moved in and out of the at least one cylinder.

The at least one cylinder and the piston arranged in the at least one cylinder preferably have a constant curvature, i.e., that the at least one cylinder and the piston have a circular curved form. It is also conceivable that the at least one cylinder may have a varying curvature. In that case, the piston is preferably made of a flexible material that changes and adapts its shape to the shape of the at least one cylinder as the piston moves back and forth in the cylinder. Another alternative is to configure the piston with a plurality of relatively short parts that are connected by universal joints or the like, which allow rotation of the joined parts relative to one another.

The longitudinal direction of the at least one cylinder should be understood as the curved direction of a centre axis through the at least one cylinder. Similarly, the longitudinal direction of the piston in the cylinder should be understood as the curved direction of a centre axis through the piston. The centre axis of the at least one cylinder and the centre axis of the piston will of course essentially coincide when the piston is arranged in the at least one cylinder.

The longitudinal extent of the piston is preferably at least as great as the longitudinal extent of the cylinder, but can also be smaller. Normally, it is desirable to be able to push the piston all the way into the at least one cylinder whilst a sufficiently large part of the piston at the opposite end projects from the at least one cylinder such that the piston can be fastened to an external part.

The piston cross-section at right angles to the longitudinal direction has preferably the same geometric shape as the cylinder cross-section perpendicular to the longitudinal direction, and preferably both the piston cross-section at right angles to the longitudinal direction and the cylinder cross-section perpendicular to the longitudinal direction are circular in shape. Alternatively, the at least one cylinder and the piston can, for example, have an elliptical shape. The piston has preferably a substantially constant cross-sectional shape in the longitudinal direction. One or both end portions of the piston may have a different shape to the rest of the piston, for example, one or both end portions may have a slightly smaller diameter than the rest of the piston. Between the piston and the cylinder in the longitudinal direction there is preferably provided a gap for a fluid in order to give maximum friction-free movement in the at least one cylinder.

The at least one curved cylinder preferably has a length such that the cylinder is semi-circular in form, i.e., that the at least one curved cylinder extends over 180 degrees. The at least one, curved cylinder can of course also be less than 180 degrees if there is no need for the whole stroke length that a cylinder of 180 degrees will give. The piston has a length that is preferably longer than the cylinder, such that the whole length of the cylinder can be utilised whilst the end of the piston that projects from the cylinder can be fastened to an external part of the device of which the torque absorber is a part.

The piston comprises an inner end portion at the end of the piston that is inside the at least one cylinder. The end portion is preferably configured with a main duct extending into the piston in the longitudinal direction from the end face of the piston, and at least one radial duct extending between the main duct and the side face of the piston so as to allow a fluid to flow through the main duct and the at least one radial duct.

The at least one cylinder has a first end portion that is preferably provided with a first end cap. In the first end cap there is preferably provided a through end cap duct so as to allow a fluid to flow into and out of the at least one cylinder. The first end cap is preferably adapted for fluid connection to a fluid tank such that a fluid can flow back and forth between the fluid tank and the cylinder. The size of the end cap duct and in part also the main duct and the at least one radial duct, determines how quickly a given fluid can flow in and out of the at least one cylinder and thus how great the absorbing effect of the torque absorber is. To be able to adjust the absorbing effect of the torque absorber, one or more adjustable valves may be provided in these ducts, preferably in the end cap duct, to adjust the fluid flow into and out of the at least one cylinder.

The at least one cylinder also comprises a second end portion where the piston is moved in and out of the cylinder. The second end portion is preferably provided with one or more gaskets and/or sealing devices to prevent the fluid, which is in the gap between the piston and cylinder, from flowing out of the cylinder. The second end portion of the at least one cylinder is further preferably provided as an annular second end cap surrounding the piston. The second end cap can advantageously be provided with a gasket that seals between the piston and the second end cap.

There is also provided an apparatus for screwing together tubular elements, the apparatus comprising a first part and a second part that are rotatable relative to each other about an axis of rotation. The apparatus comprises at least one torque absorber as described above for absorbing a rotational torque that occurs between the first part and the second part during the screwing together of tubular elements.

Both the first part and the second part can, in one embodiment of the invention, be rotatably supported in the apparatus. In other embodiments of the invention, only the first part or only the second part is rotatably supported in the apparatus.

The at least one cylinder of the torque absorber can be fastened to the first part and the torque absorber piston can be fastened to the second part. Alternatively, the at least one cylinder of the torque absorber can of course be fastened to the second part and the torque absorber piston can be fastened to the first part.

If the at least one cylinder is fastened to the first part, the first part preferably comprises a support device for supporting the at least one cylinder. This support device is preferably a cylindrical cradle that has a curved shape corresponding to the curved shape of the at least one cylinder, and that extends along the whole of or at least a part of the at least one cylinder such that the forces that arise when the piston is pushed into the cylinder are distributed on a large surface in the support device. The piston in the at least one cylinder is preferably fastened to the second part of the apparatus such that the at least one torque absorber can absorb a rotational torque that occurs between the first part and the second part.

The apparatus preferably comprises a drive unit for rotation of the first part. The drive unit may, for example, be configured with a motor that drives one or more gears that are in engagement, directly or indirectly, via more gears, with a toothed rack that is arranged on the first part. Alternatively, the first part can be driven directly by an electric, hydraulic, or pneumatic motor or by means of another suitable drive unit that is capable of rotating the first part.

The second part of the apparatus further comprises preferably a first gripping device for gripping and holding a first element. The configuration of the first gripping device is of course dependent upon how the first element is configured. A person of skill in the field will however be able to design a suitable gripping device or use an existing gripping device as soon as the configuration of the first element is known. For example, the first gripping device may be tongs adapted to grip and hold a pipe or a tool that has a similar cylindrical shape, but other gripping devices can be used if the shape of the first element so requires.

The apparatus preferably also comprises a second gripping device for gripping and holding a second element. The configuration of the second gripping device is of course also dependent upon how the second element is shaped. Here too, those of skill in the field will be able to design a suitable gripping device or use an existing gripping device as soon as the shape of the second element is known. For example, the second gripping device can be tongs adapted to grip and hold a pipe or a tool that has a similar cylindrical shape. Other gripping devices can of course also be used if the shape of the second element so requires.

The first gripping device or the second gripping device, or possibly both the first and the second gripping device are preferably rotatably arranged in the apparatus. It is thus possible to obtain relative rotation between a first element, which is held by the first gripping device, and a second element, which is held by the second gripping device, either by allowing, for example, the first gripping device to rotate whilst the second gripping device remains at rest without rotating, or alternatively by allowing the first gripping device and the second gripping device to rotate at different rotational speeds.

In an embodiment of the invention, the first gripping device is preferably a part of the second part of the apparatus and is thus rotatably arranged as described above such that the first element that is held by the first gripping device can be rotated about the axis of rotation. An alternative is also that the first gripping device is driven by a separate drive unit, if so desired. Such a drive unit may be configured in the same way as the first and the second drive unit. The second gripping device is, in this embodiment of the invention, preferably non-rotatably arranged in the apparatus. When the first part is rotated, the torque absorbers will push on the second part, which thus also rotates. The first gripping device and the first element that is held by the first gripping device will then also be rotated.

The second gripping device can, as mentioned, if desirable also be rotatably arranged in the apparatus and thus be rotated by a drive unit which may be configured in the same way as the other drive units that are described above.

In one embodiment, the apparatus is adapted for screwing together corresponding threaded portions on the first and the second element. For example, the first and the second element may be tubular elements. Alternatively, the first element may be a tool, for example, a downhole tool that is screwed onto the second element, which may be a tubular element, or another tool, for example, another downhole tool.

For the at least one torque absorber to be able to transfer the rotational torque from the first part to the second part without the piston being pushed into the cylinder, the pressure of the fluid in the cylinder is preferably regulated such that it exceeds the forces that are necessary to rotate the first element and screw together the first element and the second element that is held by the second gripping device. As the first element and the second element are screwed fully together, an impact occurs as the bottom of the threaded portions on the first and second elements is reached. When this happens, the rotational torque that occurs rapidly exceeds the pressure of the fluid in the cylinder of the at least one torque absorber, the piston is pushed into the cylinder and the rotational torque is absorbed such that the chances of the threaded portions on the first element and/or the second element being damaged or destroyed are reduced to a minimum. During the time it takes for the piston to be pushed into the cylinder, the driving force from the drive unit that rotates the first part, is reduced and preferably stopped completely, thereby preventing damage to the threaded portions on the first element and the second element that are screwed together. The value of the pressure in the cylinder can thus be regulated to a value that causes the threaded connection to be tightened with the desired force.

The apparatus is preferably provided with at least two torque absorbers, the positions of which are offset relative to one another in the circumferential direction around the axis of rotation so as to obtain a better distributed load on absorption of a rotational torque that occurs between the first and second part of the apparatus. In one embodiment of the apparatus, the apparatus is provided with two torque absorbers, where the position of one of the torque absorbers is offset 180 degrees in the circumferential direction relative to the other torque absorber. If there is a need for more absorption than the two torque absorbers can provide, three torque absorbers may be used, which are preferably offset 120 degrees relative to one another in the circumferential direction around the axis of rotation, or more. The torque absorbers may rest against each other in the axial direction of the axis of rotation or, if desired, be arranged spaced apart in the axial direction of the axis of rotation.

One use of a torque absorber and an apparatus as described above, is for absorbing rotational torques that occur when tubular elements are screwed together. Another use is the screwing together of a tool and a tubular element or the screwing together of two different tools. A torque absorber and an apparatus as described above are particularly useful during drilling or the production of a hydrocarbon well where there is a need to screw tubular elements onto a pipe string and possibly to screw a downhole tool onto a pipe string.

BRIEF DESCRIPTION OF THE DRAWINGS

Other features and advantages of the invention will be apparent from the following description of a non-limiting, preferred embodiment of the present invention, with reference to the figures, wherein:

FIG. 3 shows the same torque absorber as in FIG. 1, but with the piston pushed all the way into the cylinder.

FIG. 4 is an enlarged view of portion A that is indicated in FIG. 3.

FIG. 5 is an enlarged view of portion B that is indicated in FIG. 3.

DETAILED DESCRIPTION OF THE INVENTION

Figure 2:
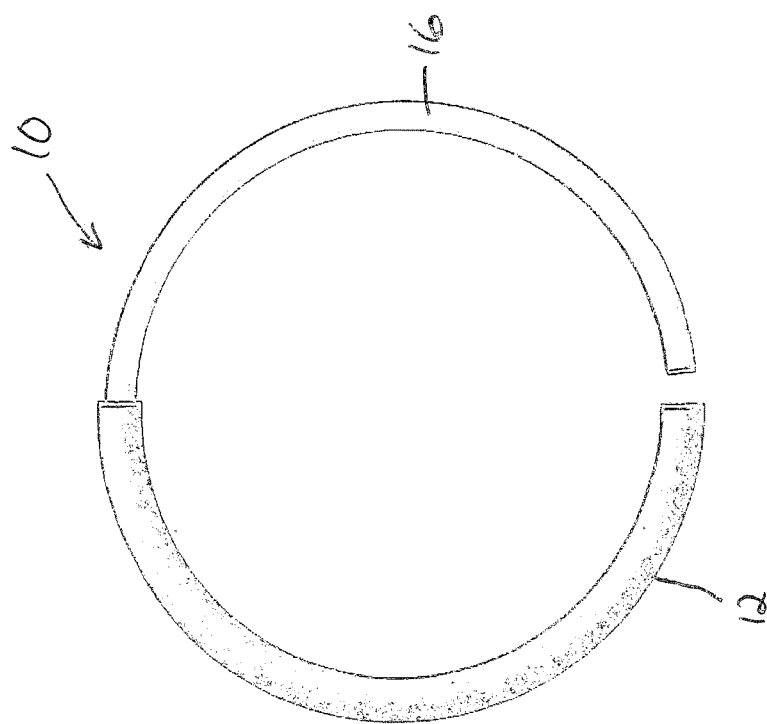
FIG. 2 shows a view of the torque absorber in FIG. 1.
Figure 1:
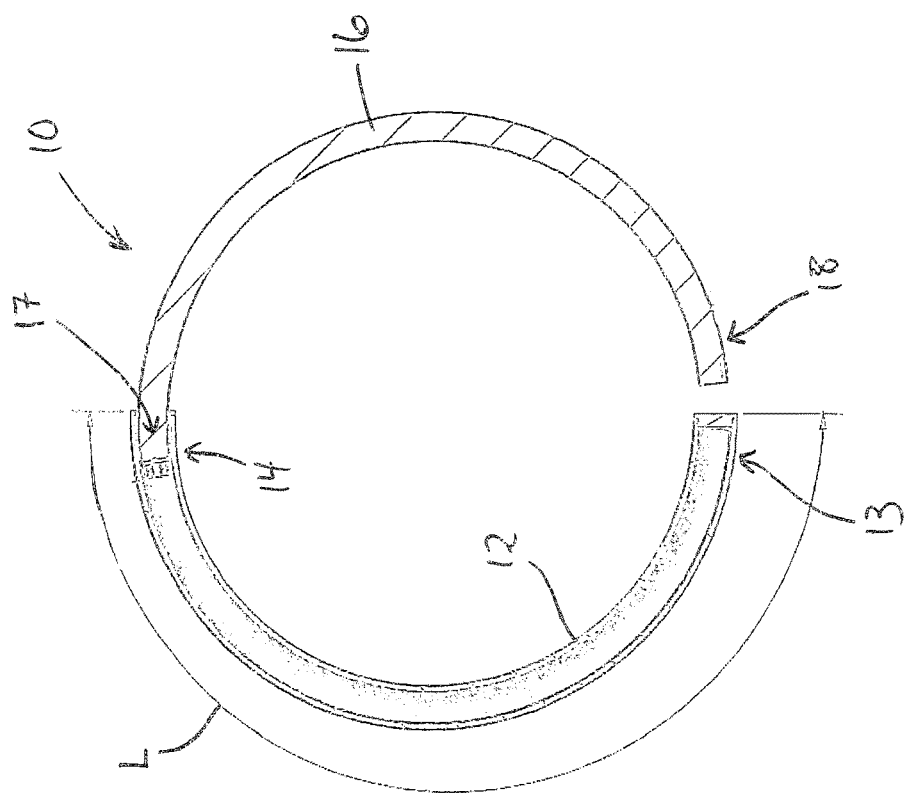
FIG. 1 is a section through a torque absorber according to the present invention in a plane in the circular arc shaped longitudinal direction of the torque absorber, and where the piston has been drawn out into its outer position where major part of the piston has been drawn out of the cylinder.

FIGS. 1-5 show a torque absorber 10 according to the present invention. The torque absorber comprises a cylinder 12 and a piston 16 arranged in the cylinder 12, and is reciprocally movable in the cylinder. The cylinder has a first end portion 13 innermost in the cylinder and a second end portion 14 where the piston enters the cylinder. The piston 16 has a first end portion 17 that is in the cylinder and a second end portion 18 at the opposite end of the piston. In FIGS. 1-2, the torque absorber 10 is shown with the piston drawn all the way out of the cylinder 12, whilst in FIGS. 3-5 the torque absorber 10 is shown with the piston 16 pushed all the way into the cylinder 12.

As shown clearly in the figures, the cylinder 12 has a curved shape that is preferably circular. The longitudinal direction of the cylinder is indicated by the cylinder centre axis T that has the same circular curved shape as the cylinder itself. The piston 16 has a corresponding circular curved shape such that it can move reciprocally in the cylinder. As indicated in the figures, the cylinder spans across an arc L of about 180 degrees, i.e., that the cylinder is essentially semi-circular in form. The piston 16 is preferably slightly longer than the cylinder 12 such that when it is pushed all the way into the cylinder, the second end portion 18 of the piston still projects from the cylinder. If the need for a stroke length is smaller, the cylinder may have a curve that is less than 180 degrees, for example, 90 degrees.

FIG. 4 shows section A in FIG. 3 where the first end portion 13 of the cylinder 12 and the first end portion 17 of the piston 16 are clearly visible. The first end portion 17 of the piston has an end face 21 in the front of the piston and a side face 23 facing the cylinder wall 24. The piston 16 comprises at least one main duct 20 extending from the end face 21 some way into the piston 16, and at least one radial duct 22, but preferably a plurality of radial ducts 22, connecting the main duct 20 and the side face 23 of the piston so as to allow a fluid to flow through the main duct and the radial ducts in order to distribute fluid around the piston and ensure that the gap 25 between the side face 23 of the piston and the cylinder wall 24 is filled with fluid.

The first end portion 13 of the cylinder 12 is further provided with a first end cap 28. The first end portion 13 and the first end cap 28 are preferably provided with corresponding threaded portions such that the first end cap 28 can be screwed onto the first end portion 13 of the cylinder as shown in the figures.

The first end cap 28 is further provided with a through end cap duct 29 for through-flow of a fluid. To control the fluid flow a valve device 30 can be provided in the end cap duct 29.

The first end cap 28 is further preferably adapted such that a pipe, hose or a similar means can be connected to the end cap duct 29 and a fluid tank so as to allow fluid that is in the cylinder 12 to be pumped into the fluid tank when the piston 16 is pushed into the cylinder. When the piston 16 is drawn out of the cylinder 12, fluid will be drawn back into the cylinder again. An alternative to using a pipe, a hose or the like to connect the end cap duct 29 to a fluid tank may be to allow the fluid tank to surround the first end portion 13 of the cylinder such that the first end portion 13, and thus the end cap duct 29, are immersed in the fluid in the fluid tank. The fluid is preferably a hydraulic oil or other suitable fluid that has lubricating properties.

To prevent the fluid in the cylinder 16 from flowing out of the cylinder, there is preferably provided a sealing means or gasket 26 on the end portion 17 of the piston which seals against fluid flow between the end portion 17 of the piston and the cylinder wall 24.

FIG. 5 is an enlarged view of section B in FIG. 3. The figure shows the second end portion 14 of the cylinder 12 and a part of the piston 16. The piston 16 extends out of the cylinder 12, and to prevent the fluid in the gap 25 between the piston 16 and the cylinder wall 24 from flowing out of the cylinder, the second end portion 14 is provided with a second end cap 32. The second end cap 32 is configured with a through opening for the piston 12. The second end cap 32 and the second end portion 14 of the cylinder are preferably provided with corresponding threaded portions such that the second end cap 32 can be screwed onto the second end portion 14. Gaskets 33 are disposed between the second end cap 32 and the piston 16 to seal against fluid flow. For additional sealing, a desired number of seals 34 can be disposed between the cylinder 12 and the piston 16 as shown in FIG. 5.

The second end portion 18 of the piston 12 and the cylinder are preferably provided with respective fastening devices (not shown in the figures) such that they can be fastened to devices or two parts of a device that rotate relative to one another and are thus able to take up any rotational torque or impact that might occur. Such fastening devices may be one or more bolts or other suitable fasteners.

Figure 6:
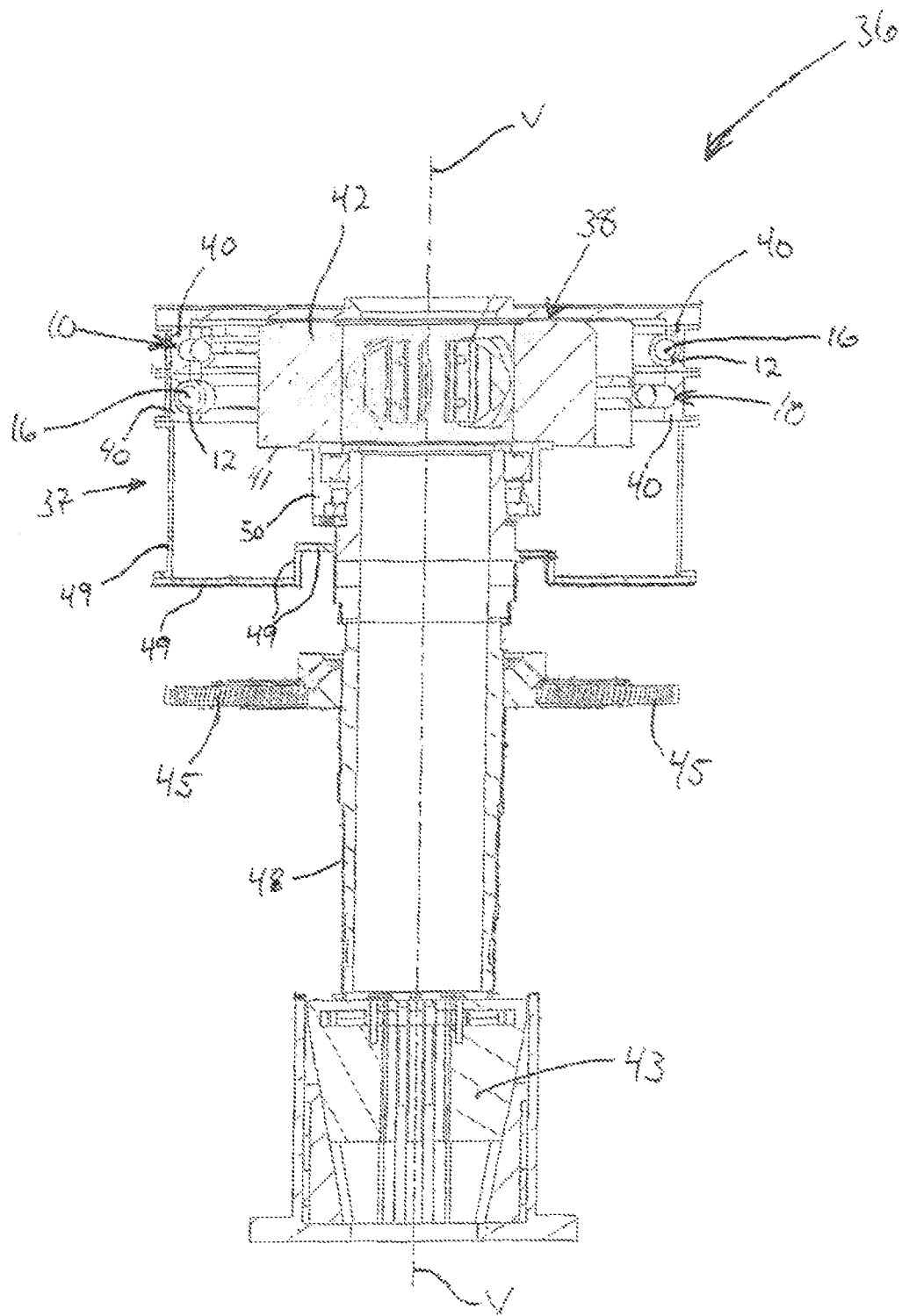
FIG. 6 shows an apparatus comprising two torque absorbers according to the invention.

FIG. 6 shows an apparatus 36 comprising two torque absorbers as described above. The apparatus comprises a first part 37 and a second part 38, the first part and the second part being rotatably arranged about an axis V through the apparatus.

As shown in FIG. 6, the first part 37 comprises at least one cylindrical portion 48, a plurality of connecting elements 49, for example, four connecting elements as shown in FIG. 6, and one or more support devices 40, all the parts being fixedly connected to each other by suitable fastening means, such as by bolts or by welding.

The apparatus comprises a drive unit 45 as schematically illustrated in FIG. 6, to rotate the first part 37. The drive unit 45 can, as explained in the general portion of the application, be of different types, as for instance, a motor, which, via a mechanical transmission such as one or more gears and possibly a toothed rack, rotates the first part 37. The drive unit for rotating the first part 37 may also be a hydraulic or pneumatic system or another device capable of rotating the first part 37.

The first part 37 preferably comprises two torque absorbers 10 as described above. The two torque absorbers are arranged one above the other in the axial direction along the axis of rotation V and offset 180 degrees relative to one another in the circumferential direction around the axis of rotation V so as to obtain a more even load around the axis of rotation when a rotational torque is absorbed by the two torque absorbers 10. It should also be mentioned that there is nothing to prevent the apparatus from being provided with more than two torque absorbers 10, for example, four torque absorbers that are offset 90 degrees relative to one another in the circumferential direction about the axis of rotation V.

The first part 37 comprises, as mentioned above, at least one support device 40 that extends 360 degrees around the axis of rotation V and on which the torque absorber 10 cylinders 12 are supported. Alternatively, the first part 37 is provided with a support device 40 for each cylinder and thus has preferably basically the same length as the cylinder that is supported on each support device 40. The cylinders 12 can be fastened to the support device 40 by bolts or other suitable fasteners. The support unit or units 40 have the form of a cradle and will rotate together with the rest of the first part 37.

When the drive unit 45 applies a rotational torque to the cylindrical portion 48, the whole of the first part 37, including the support unit(s) 40 on which the cylinders 12 of the torque absorbers are mounted, is thus rotated. The cylinders 12 can thus also be regarded as being a part of the first part 37.

The second part 38 comprises a support element 50 and a housing 41 that are fastened to each other. The support element 50 is supported on the cylindrical portion 48 and is rotatable relative to the cylindrical portion 48, such that the second part 38 is rotatable both relative to the first part 37 and relative to the rest of the apparatus 36. The second part further comprises a first gripping device 42 that is arranged in the housing 41 and is adapted for gripping and holding a first element (not shown in the figures) such as a tubular element, a bottom hole assembly (BHA) or a downhole tool.

The second end portion 18 of the torque absorber pistons 16 is preferably fastened by bolts or other suitable fastening means (not shown in the figure), to the second part 38 of the apparatus. The pistons 16 can therefore be regarded as being a part of the second part 38. The first part 37 and the second part 38 are thus connected through the torque absorbers 10.

The apparatus 36 further comprises a second gripping device 43 that is preferably adapted for gripping and holding a tubular element or a pipe string, or possibly a bottom hole assembly or a downhole tool (not shown in the figures). The second gripping device 43 may be, but is not necessarily, rotatably arranged in the apparatus 36.

When the first part 37 is rotated by the drive unit 45, the torque absorber cylinders 12 will have the same rotary motion imparted thereto. By regulating the pressure of the fluid in the torque absorbers 10 such that the force necessary to push the torque absorber pistons 16 into the respective cylinders 12 is greater than the force necessary to screw the first element, which is held by the first gripping device 42, onto the second element, which is held by the second gripping device 43, the second part 38 will rotate together with the first part 37 without the pistons 16 being pushed into the cylinders 12. Further, the pressure of the fluid in the cylinders 12 is preferably regulated such that when a rotational torque, in the form of an impact, occurs as the first element, which is held by the first gripping device 42, is screwed all the way onto the second element, which is held by the second gripping device 43, the pistons 16 yield and are pushed into their respective cylinders 12, the rotational torque thus being absorbed by the torque absorber or absorbers 10. The pressure of the fluid in the cylinders 12 is thus regulated preferably such that it is sufficiently large to allow the first element to be screwed onto the second element yet such that it is less than a critical pressure value. The critical pressure value must be below a value that produces a risk of damage to the threaded portions of the first element and/or the second element when a rotational torque occurs. In addition to the pressure in the cylinders 12 having to lie between the two said values that have the effect that the pistons are not pushed into the pistons when screwing together takes place and at the same time that they yield before the threaded portions are destroyed when the threaded portions are screwed fully together, the pressure will preferably be regulated so that the threaded portions of the elements being screwed together are tightened with the desired force.

To be able to regulate the pressure of the fluid in the cylinders 12, the apparatus 36 is preferably provided with a hydraulic system which at least comprises one or more pressure sensors that register the pressure of the fluid, a pump device capable of increasing the pressure of the fluid to a desired level, and one or more valve devices that can be controlled to reduce the pressure of the fluid. This will be a technically obvious hydraulic design, which therefore will not be described in more detail here.

The invention has been described above with reference to a non-limiting example. A person of skill in the art will, however, appreciate that the invention, as explained above and illustrated in the figures, can be modified and that changes can be made within the scope of the invention as defined in the claims. For example, the cylinders 12 and the pistons 16 can switch position in the apparatus 36 such that the cylinders 12 are supported in the second part 38 and the pistons 16 are fastened in a suitable manner to the first part 37. It should further be mentioned that the example above describes an apparatus 36 adapted to screw together two elements in the form of two tubular elements or a tubular element and a downhole tool, or possibly two downhole tools, where the torque absorbers 10 of the apparatus are adapted to absorb a rotational torque that occurs when the two elements are screwed fully together. It is however obvious that the torque absorber 10 described above can be used in other types of devices and apparatus where it is desirable to absorb a rotational torque.

The invention claimed is:

1. An apparatus for screwing together of corresponding threaded portions on a first tubular element and a second tubular element, wherein the apparatus comprises a first part that is rotatably arranged about an axis V and a second part that is rotatably arranged about the axis V, wherein the first part and the second part are rotatable relative to one another, the apparatus further comprising at least one torque absorber for absorbing of a rotational torque that occurs between the first part and the second part when the first tubular element and the second tubular element are screwed together, the torque absorber comprising at least one cylinder and at least one piston that is movably arranged in the cylinder, the at least one cylinder being curved in the longitudinal direction of the cylinder and the at least one piston having a corresponding curved shape such that the at least one piston can be moved into and out of the at least one cylinder, the at least one cylinder being fastened to the first part and the at least one piston being fastened to the second part, and further wherein the piston comprises an inner end portion that is arranged in the cylinder, which end portion is configured with a main duct extending into the piston in the longitudinal direction from an end face on the piston, and at least one radial duct extending between the main duct and a side face of the piston such that a fluid can flow through the main duct and the at least one radial duct.

2. The apparatus according to claim 1, wherein the first part comprises a support device for supporting the at least one cylinder.

3. The apparatus according to claim 1, wherein the apparatus comprises a first drive unit for rotation of the first part.

4. The apparatus according to claim 1, wherein the apparatus comprises a second drive unit for rotation of the second part.

5. The apparatus according to claim 1, wherein the apparatus comprises a first gripping device for gripping and holding a first element.

6. The apparatus according to claim 5, wherein the apparatus is adapted for screwing together corresponding threaded portions on the first and the second element.

7. The apparatus according to claim 5, wherein the first and the second element are tubular elements.

8. The apparatus according to claim 1, wherein the second part comprises a second gripping device for gripping and holding a second element.

9. The apparatus according to claim 1, wherein a first gripping device and/or a second gripping device is rotatably arranged in the apparatus.

10. The apparatus according to claim 1, wherein the apparatus is provided with at least two torque absorbers, where the positions of the torque absorbers are offset in the circumferential direction relative to one another such that a better distributed load is achieved when absorbing an applied torque.

11. The apparatus according to claim 1, wherein the apparatus is provided with two torque absorbers, where the position of one of the torque absorbers is offset 180 degrees in the circumferential direction relative to the other torque absorber.

12. The torque absorber according to claim 1, wherein the piston has a constant cross-section in the longitudinal direction, and that between the piston and the cylinder in the longitudinal direction there is provided a gap for a fluid.

13. The torque absorber according to claim 1, wherein the cylinder has a first end portion that is provided with a first end cap, in which first end cap there is provided a through end cap duct such that a fluid can flow into and out of the cylinder.

14. The torque absorber according to claim 13, wherein the end cap is adapted for fluid connection to a fluid tank such that a fluid can flow back and forth between the fluid tank and the cylinder.

* * * * *